United States Patent [19]
O'Keefe

[11] 3,735,852
[45] May 29, 1973

[54] TRANSFER MECHANISM

[75] Inventor: Thomas A. O'Keefe, Wyoming, Mich.

[73] Assignee: Northwest Tool & Die, Inc., Grand Rapids, Mich.

[22] Filed: Apr. 11, 1972

[21] Appl. No.: 243,026

[52] U.S. Cl..................................198/19, 198/219
[51] Int. Cl..........................B23q 5/22, B65g 25/04
[58] Field of Search..........................198/19, 20, 218, 198/219

[56] References Cited

UNITED STATES PATENTS

| 3,077,259 | 2/1963 | Braun | 198/218 |
| 3,655,070 | 4/1972 | Haydu | 198/218 |

*Primary Examiner*—Richard E. Aegerter
*Attorney*—Glenn B. Morse

[57] ABSTRACT

A transfer mechanism is adapted for inclusion in conventional die assemblies operated by reciprocating presses. A cam-actuated drive mechanism induces transferring movement of an assembly having a lost-motion interconnection between certain components, and this lost-motion is utilized to induce a cam-controlled lifting-retracting action at the opposite extremes of a normally horizontal transferring movement. The lifting and carrying component is embraced by a member establishing a vertical guideway, and these two members move together horizontally. A second set of these members, connected in sequence, provides movement of the mechanism in three successive dimensions.

7 Claims, 31 Drawing Figures

TRANSFER MECHANISM

BACKGROUND OF THE INVENTION

The automatic movement of work pieces through the successive stages of blanking and forming dies is conventionally provided by either of two types of mechanism. In one of these, the work pieces remain secured to the original sheets or strips of material until the last operation, where they are finally separated from the sheet and dropped into some form of collecting station. Where this arrangement is not practical, separated parts are moved through the die stations by a system commonly referred to as a "transfer mechanism," which usually has a cyclical movement successively lifting the parts from one station, moving it to a subsequent station, and depositing it at the new position. The first of these stations is normally a loading station far enough outside the closure area of the die to keep the operators hands free of danger. The present invention is associated with this general type of mechanism.

The control of the components of the transfer mechanism so that they are kept in predetermined relationship with the reciprocating movements of the die sections has utilized electro-mechanical systems, pneumatic and hydraulic actuators, and completely mechanical arrangements. In the latter category, the sequence of lifting, horizontal transferring, and retracting has been induced by lost-motion connections in which one part moves another in sequence within the limitations of the abutments establishing the freedom of the lost motion. This type of system has a tremendous advantage in simplicity, and is utilized by the present invention. Examples of mechanism constructed along this principle have been noted in the following U.S. Pat. Nos: 2,929,485 to Wallis of 1960; 3,077,259 to Braun of 1963.

SUMMARY OF THE INVENTION

A transferring carrying bar is interposed between an actuator bar and a guide bar which are slidably mounted in a guideway normally on a lower die section. The carrier bar is movable only transversely with respect to the guide bar, and the actuator and the carrier bars have cam and follower interengagement along a path inclined to the guideway, thus forcing the carrier bar to move transversely before the carrier bar can move horizontally with the actuator bar. The latter movement takes place only after the limit to the transverse movement of the carrier bar has been reached either by a limit to the cam-follower system, or by a limit to the lost motion between the actuator and guide bars. Releasable means are provided for holding the guide bar at both limits of its movement parallel to the principal guideway to assure that the carrier bar has its lifting, transferring, and retracting movements in sequence, rather than intermixed. In one form of the invention, a second carrier bar is mounted in a guideway on the first carrier bar so that movement can be provided in three dimensions in sequence. Two cam-follower systems are used in this arrangement, each of these having a dwell section permitting the motions to take place in sequence.

DESCRIPTION OF THE DRAWINGS

FIG. 14 is taken on the plane 14—14 of FIG. 8.

FIG. 23 is a fragmentary plan view of this mechanism.

DESCRIPTION OF THE PREFERRED EMBODIMENTS

Figure 1:
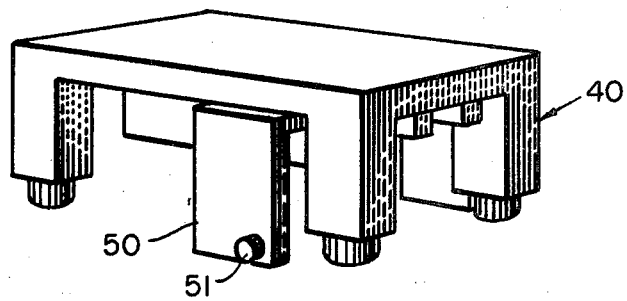
FIG. 1 is a perspective view of the upper section of a die assembly mounted on a die set, and modified to accommodate the present invention.
Figure 2:
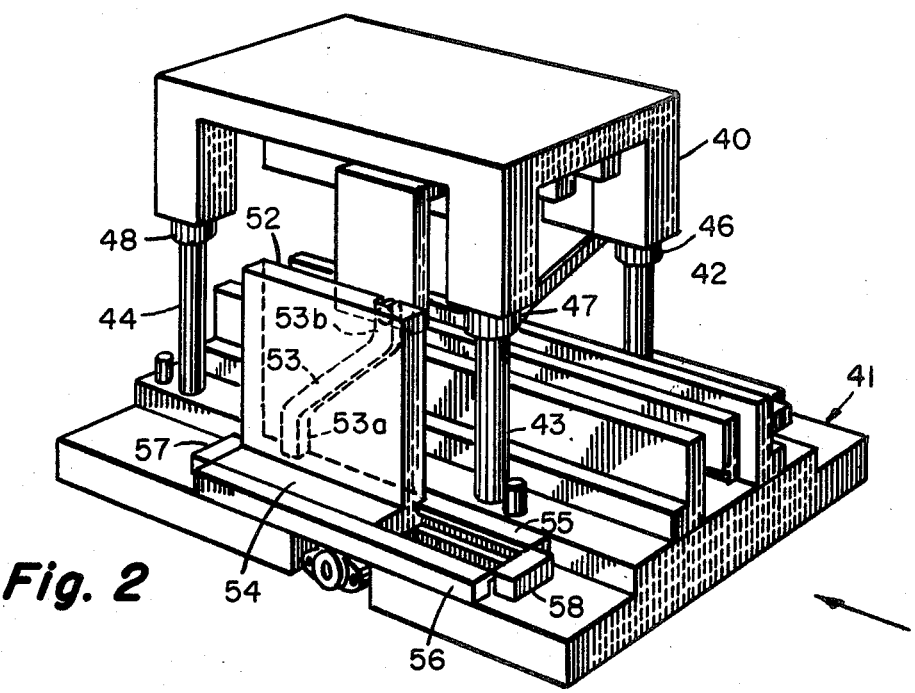
FIG. 2 is a perspective view of the complete die assembly, showing both upper and lower die sections, and the mechanism for actuating the transfer system. The upper die section is in the raised position.
Figure 3:
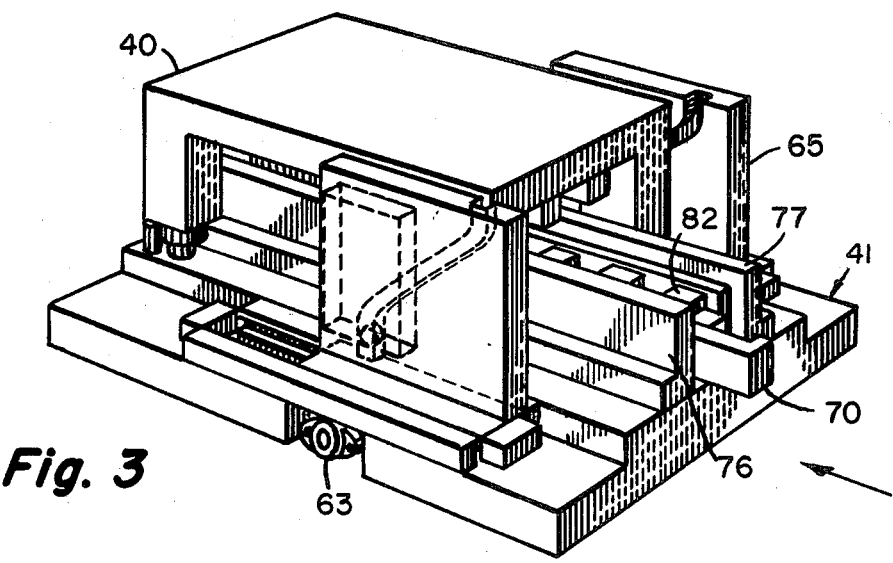
FIG. 3 is a perspective view similar to that of FIG. 2, with the upper die section in the lowered position.
Figure 4:
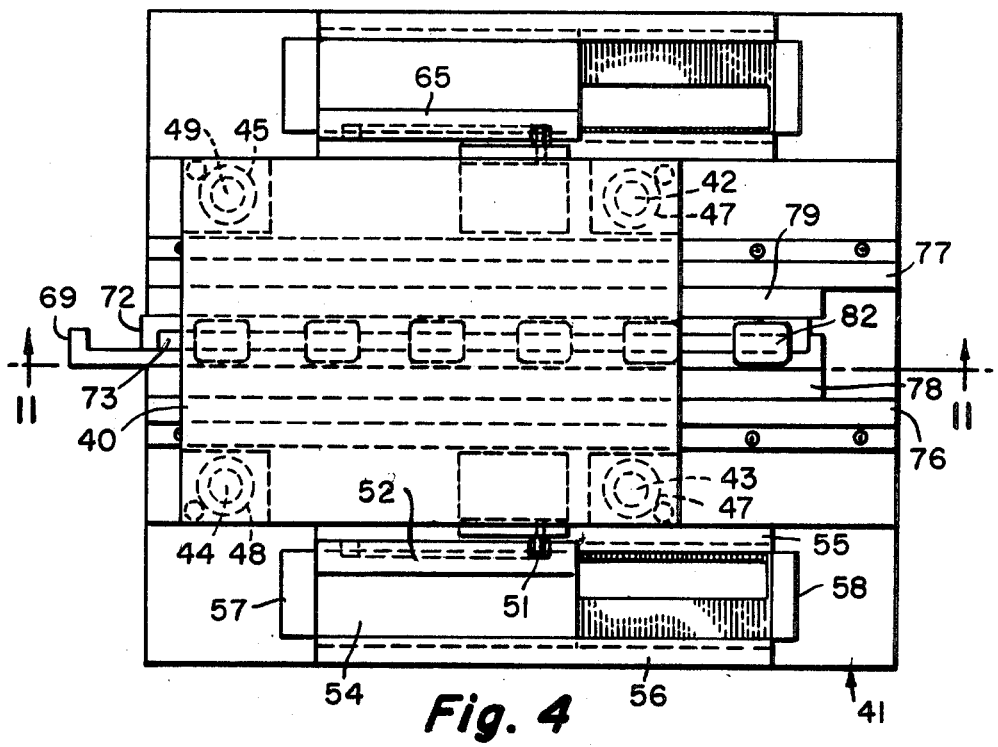
FIG. 4 is a top view of the die assembly in the FIG. 2 position.
Figure 5:
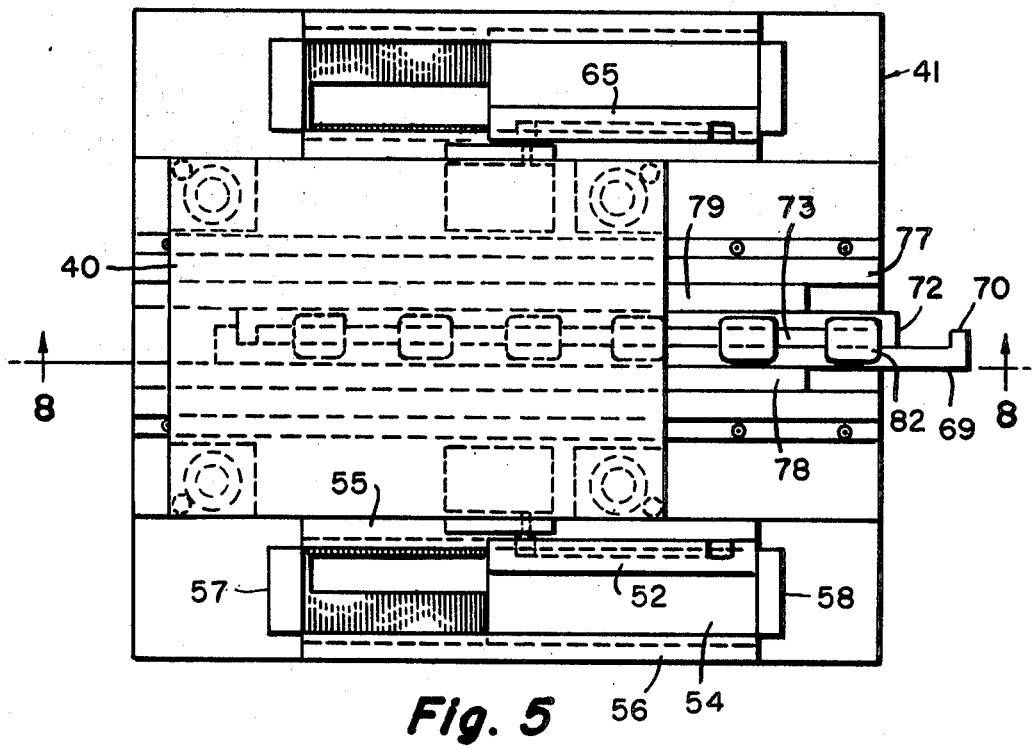
FIG. 5 is a top view of the die assembly in the FIG. 3 position.

Referring to the views on Sheet 1 of the drawings, the illustrated die assembly includes the upper die section generally indicated at 40, which is normally mounted on the ram of a punch press. The lower die section 41 is usually clamped to the bed of the punch press, and is provided with posts 43–45 in alignment with the bearings 46–49 on the upper die section 40 to maintain the lateral relationship of the upper and lower die sections so that the die components may function properly. During the reciprocating vertical motion of the upper die section induced by the ram of the punch press, the posts 42–45 will usually remain in telescoping relationship with the associated bearings 46–49. The die components that may be used for blanking, lancing, and forming work pieces are mounted on the upper and lower die sections in a conventional manner, and form no part of the present invention. The emphasis on the drawings and description here will center in the transfer mechanism inducing a movement of the work pieces through a conventional series or stations of die operations.

The reciprocating motion of the upper die section 40 is utilized to actuate the transfer mechanism. A bracket 50 mounted on the upper die section 40 carries the cam follower 51, which will normally be a conventional roller mounted on a stud, with suitable ball bearings interposed. A cam plate 52 is provided with a groove on its inner face for receiving the cam follower 51, the walls of the grooves thus forming cam surfaces. The bracket 50 and the cam follower 51 remain in fixed position with respect to the upper die section, with the result that the vertical movement of the cam follower 51 induces a linear movement of the cam plate 52 as the follower 51 enters the inclined portion of the cam groove 53. It is preferable to incorporate vertical sections shown at 53a and 53b at the opposite ends of the inclined portion of the cam groove so that variations in the stroke of the press will not affect the travel of the plate 52. The plate 52 has a base 54 having its opposite edges received in tongue-groove relationship between the guiderails 55 and 56 mounted on the lower die section 41. The end blocks 57 and 58 function as abutments limiting the free movement of the plate along this guideway.

The reciprocating horizontal movement of the cam plate 52 is utilized as a power-takeoff to drive the transfer mechanism by incorporating a section of gear rack 59 secured to the underside of the base 54 of the cam plate, and moving within a cut-out 60 in the base of the lower die section. A spur gear 61 is mounted on the shaft 62, which is rotatably supported by bearings 63 and 64 mounted on the lower die section so that the shaft 62 can extend transversely within the cut-out 60. This drive structure is repeated at the opposite side of the die assembly, so that the cam plate 65 contributes to the driving of the shaft 62 through the spur gear 66, thus minimizing the torsional deflection of the shaft.

Figure 15:
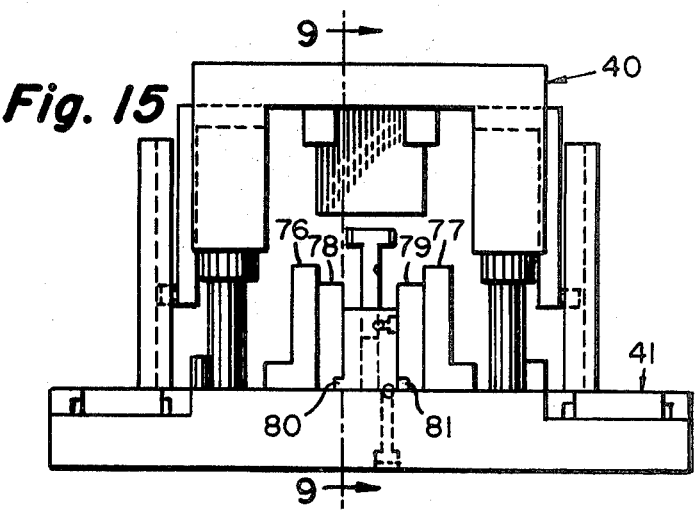
FIG. 15 is an end elevation of the die assembly in the FIG. 11 position.
Figure 14:
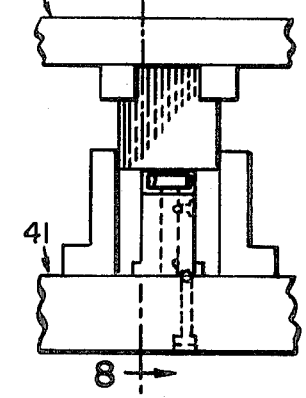
FIG. 14 is a fragmentary end elevation of the assembly in the position shown in FIG. 8.
Figure 16:
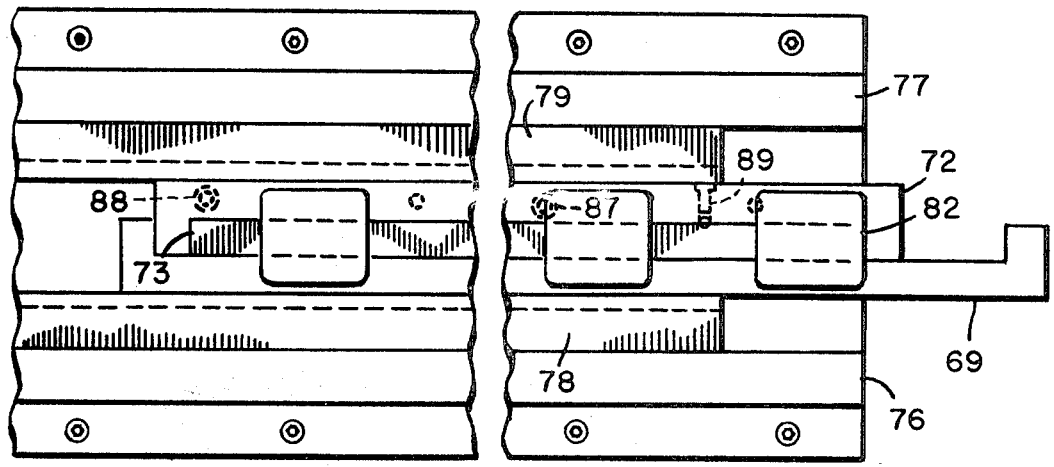
FIG. 16 is a partial top view, on an enlarged scale, of the components in the FIG. 8 position.
Figure 17:
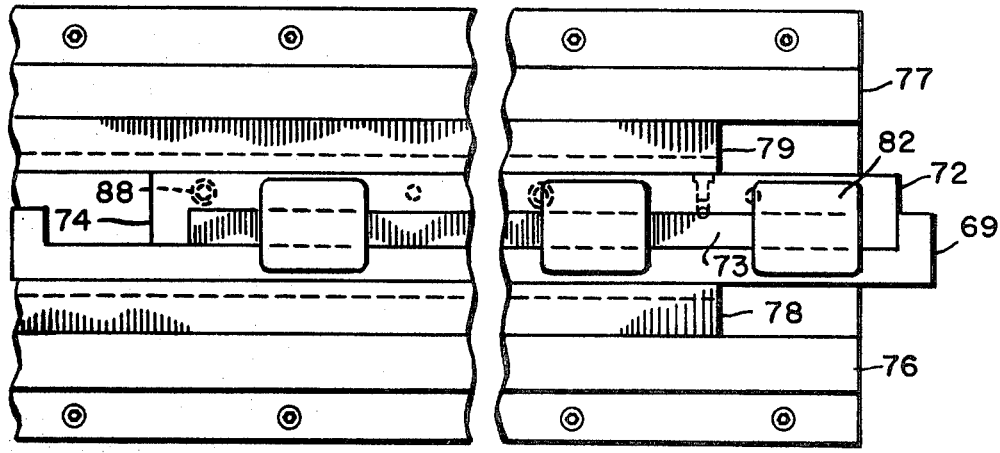
FIG. 17 is a top view similar to FIG. 16, showing the mechanism in the FIG. 9 position.
Figure 18:
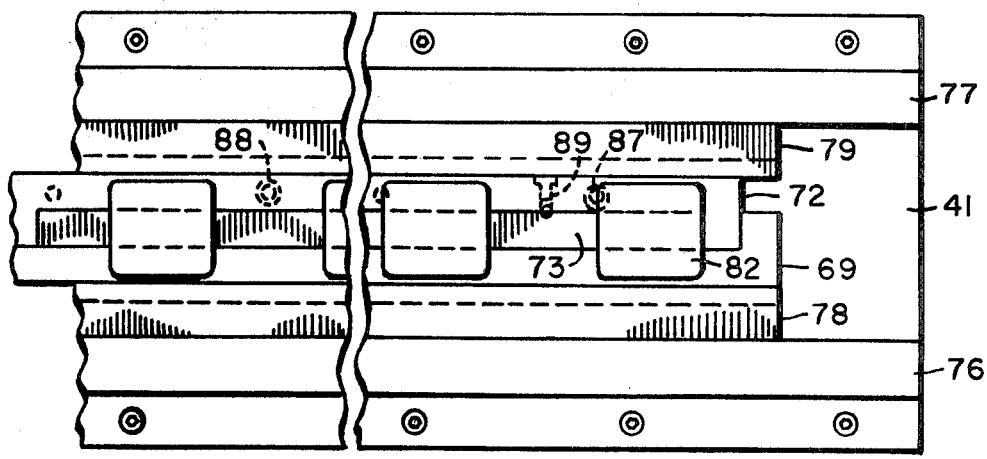
FIG. 18 is a view similar to FIGS. 16 and 17, showing the components at the end of the transferring stroke.

The rotation of the shaft 62 is utilized to drive the transfer mechanism through the central spur gear 67, which is interengaged with the rack 68 secured to the underside of the actuator bar 69, and moving within the cut-out 60 in the base of the lower die section. The actuator bar 69 has the transverse end extensions 70 and 71, and the guide bar 72 is received between these with several inches of lost motion so that the guide bar 72 can slip back and forth between the abutments formed by the extensions 70 and 71. The carrier bar 73 has an overall length very slightly less than the distance between the end extensions 74 and 75 on the guide bar 72, so that the only freedom of movement that the carrier bar 73 has with respect to the guide bar 72 is in a vertical direction. The carrier bar 73 is interposed between the guide bar 72 and the actuator bar 69. This assembly is slideably received in a guideway in the lower die section formed by the opposite angle rails 76 and 77 (refer to FIG. 15), together with the plates 78 and 79 which are offset along their lower edge to receive the flange 80 of the actuator bar and the flange 81 of the guide bar 72. The plates 78 and 79 are normally secured to the angle rail 76 and 77, and are locked in place after the particular vertical position has been determined to provide the desired holding-sliding relationships with the flanges 80 and 81.

The carrier bar 73 is provided with a number of pads 82 corresponding to the number of operating stations in the die assembly, the pads being positioned to receive the work pieces at the various stations. The action of the transfer mechanism involves the lifting of the pads 82, the movement of the bar 73 to transport the work pieces carried by the pads to the next station, followed by the retraction downward of the carrier bar 73 and its return to the initial position. This sequence of operations is made possible by the combination of the lost motion of the guide bar 72 with respect to the actuator bar 69, together with the interengagement of the cam followers 83 and 84 (secured to the actuator bar 69) with the inclined slots 85 and 86 in the carrier bar 73. The walls of the slots 85 and 86 form cam surfaces responsible for the lifting of the carrier bar 73, and for its retraction downward into inactive position on depositing the work pieces at the new stations. The relative placement of the inclined cam slots 85 and 86 with respect to the lost motion freedom of the guide bar 72 (and the ends of the carrier bar 73) is such that the followers 83 and 84 are at the lower left extremities of the cam slots 85 and 86 with the guide bar 72 at the right-hand extremity of its freedom of movement with respect to the actuator bar 69. This limitation of movement can either be determined by the engagement of the guide bar 72 with the end extension 70, or by the engagement of the followers 83 and 84 with the ends of the cam slots 85 and 86. It is much preferable that the extension 70 be used as the limiting abutment.

Figure 21:
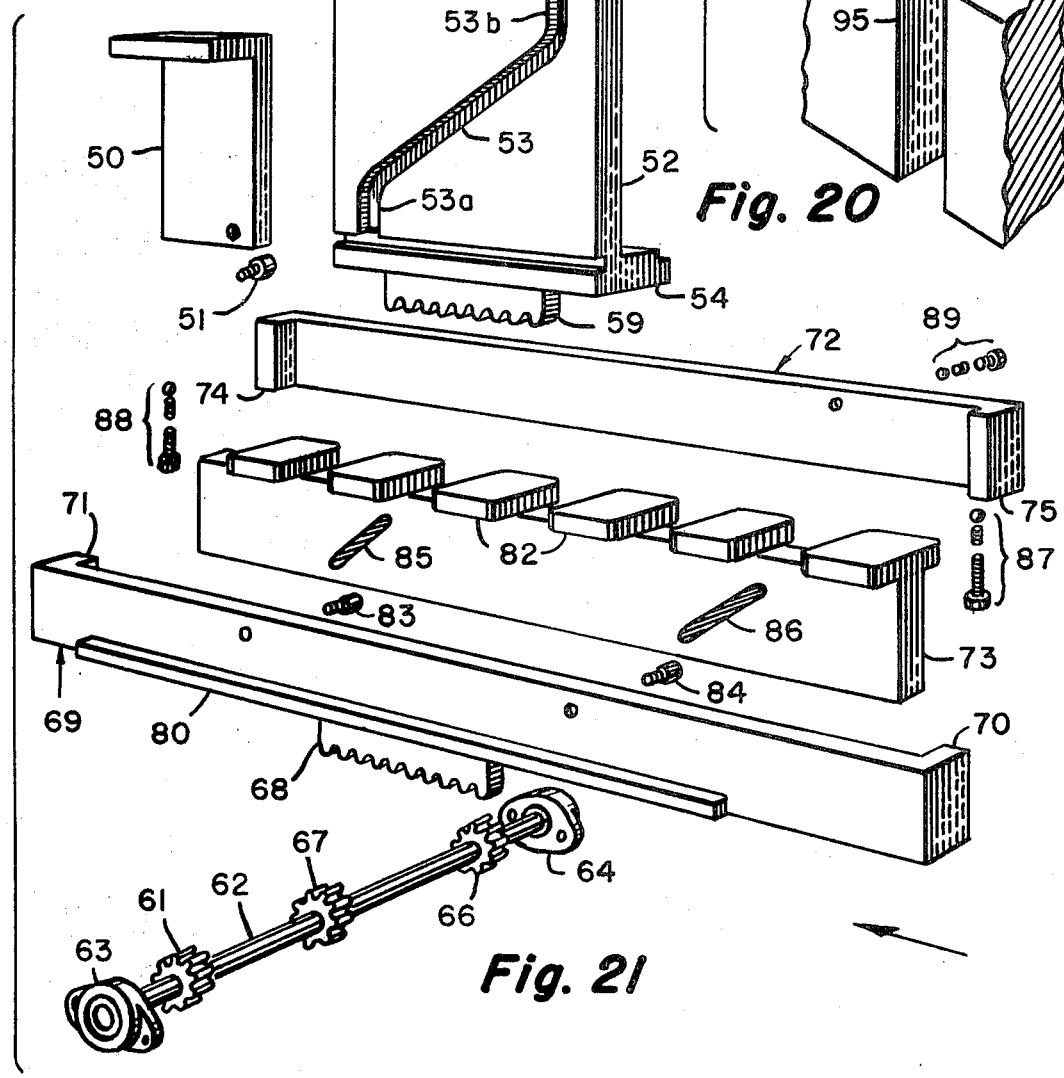
FIG. 21 is an exploded view of the principal components of the form of the transfer mechanism utilizing detents as a restraint device.

At the beginning of an operational cycle, the actuator bar 69 may be considered as having been moved previously to the right (refer to FIG. 21), with the consequent result of placing the guide bar 72 and the carrier bar 73 at the left extremity of its freedom of movement with respect to the actuator bar 69. This limiting position will normally be determined by the presence of the end extension 71 engaging the end of the guide bar 72. Under these circumstances, the followers 83 and 84 (since these form the points of interengagement which pull the guide bar 72 and the actuator bar along) will be disposed near the tops of the cam slots 85 and 86, and will have induced the lowering of the carrier bar 73 to its lowest position determined either by the engagement of the followers 83 and 84 with the tops of the slots 85 and 86, or by the engagement of the underside of the carrier rail 73 with the guideway structure. The initial phase of the transfer movement is therefore to utilize the full extent of the lost motion by beginning the movement in the direction of the arrow of the actuator bar 69 by the rack 68. Since forces are applied exclusively by the actuator bar through the followers 83 and 84 at this stage, the first action will be the elevation of the carrier bar because of the incline of the slots 85 and 86. During this phase of the movement, a degree of restraint is applied to the guide bar by the presence of the spring-loaded detent assemblies 87 and 88 incorporated in the base of the lower die section or at some other convenient point, and engageable with recesses in the guide bar 72 at both of its extremes of horizontal movement. These detent assemblies are themselves conventional, and consist merely in a small ball urged outward by a spring under adjustable compression determined by a backing screw. A given degree of force parallel to the guideway structure on the lower die section will result in moving the guide bar 72 out of the grasp of the detents. The function of these detents is to hold the guide bar gently in position until the extremes of lifting and retraction induced by the inclined cam slots 85 and 86 have been completed. One or more auxiliary detents of this same type can be incorporated in the guide bar 72, as shown at 89 in FIG. 21, to maintain the elevated position of the carrier bar 73 during the transferring movement. This detent tends to prevent weight on the carrier bar 73 from moving the carrier bar faster than the actuator bar 69 during the transfer movement, accompanied by a sliding of the carrier bar 73 down the slope provided by the inclined cams 85 and 86.

Figure 19:
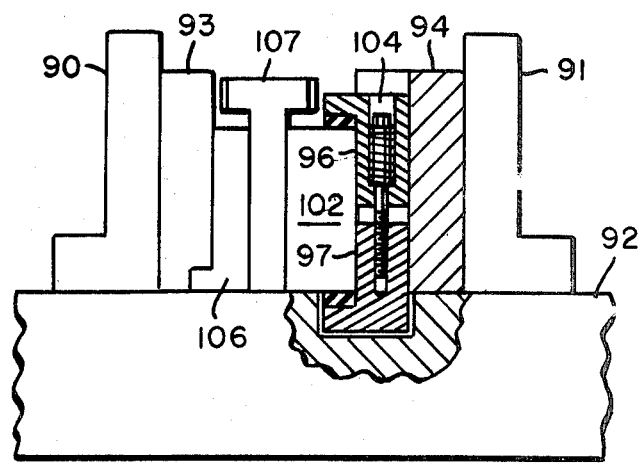
FIG. 19 is an end view of a modified form of the invention, partially in section, illustrating a brake mechanism replacing the holding detents of the previous form of the invention.
Figure 20:
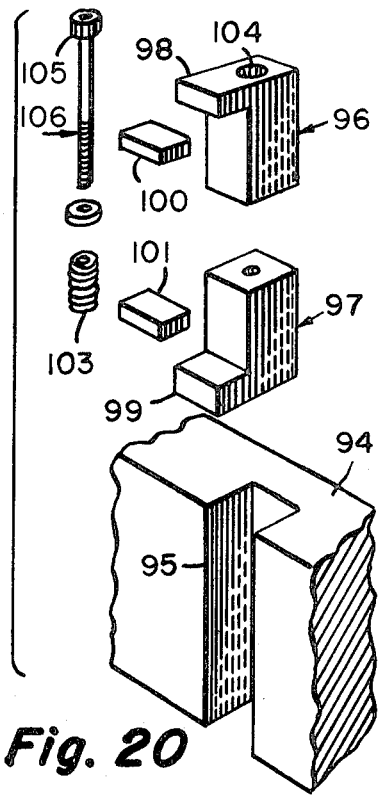
FIG. 20 is an exploded view in perspective showing the components of the friction brake mechanism appearing in FIG. 19.

The modified form of the invention shown in FIGS. 19 and 20 provides a different type of restraint for the guide bar with respect to the lower die section. The angle rails 90 and 91 are secured to the base 92 of the lower die section in the usual manner, and correspond to the rails 76 and 77 of FIG. 15. The plate 93 corresponds to the plate 78, and the plate 94 performs the function of the plate 79. The plate 94, however, is of greater thickness, and contains the vertical groove 95 which slidably receives the brake assembly with freedom of movement in a vertical direction. This brake assembly includes the upper and lower shoes 96 and 97, each of which have the shoulders as shown at 98 and 99 to which small pieces of bearing material similar to brake lining (indicated at 100 and 101 in FIG. 20) are secured. These bearing pads engage the upper and lower surfaces of the guide bar 102, as shown in FIG. 19, and the intensity of this interengagement is determined by the compression spring 103 confined between the bottom of the recess 104 in the upper shoe 96 and the underside of the head 105 of the bolt 106 in threaded engagement with the lower shoe 97. Adjustment of this screw will vary the degree of compression on this spring 103, and consequently vary the gripping action on the guide bar 102. This assembly of brake shoes is permitted to find its own vertical placement determined by the guide bar 102, as a result of the location within the slot, but this slot effectively restrains any movement of the brake shoes in any direction except vertical. The actuator bar 106 and the carrier bar 107 in the FIG. 19 assembly correspond to the corresponding components 69 and 73 of FIG. 21.

Figure 6:
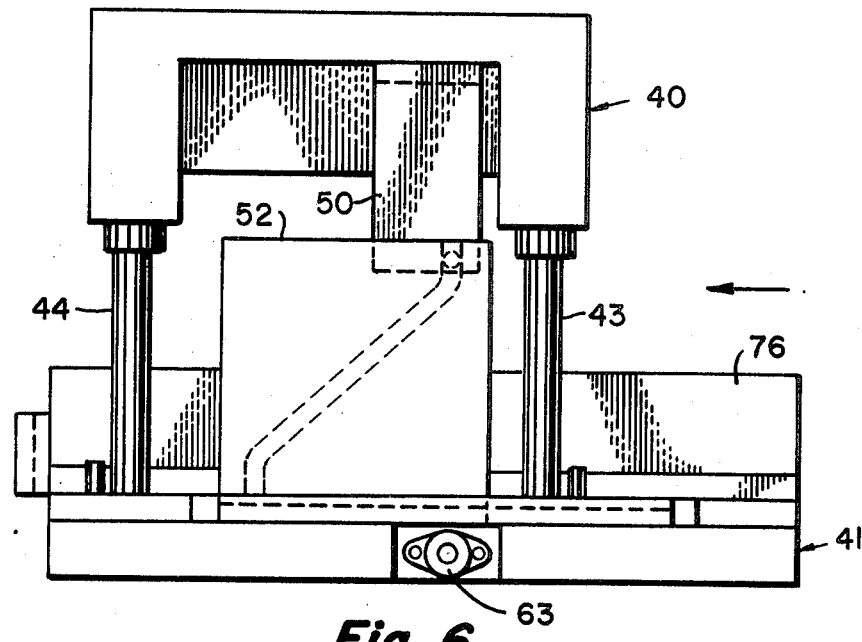
FIG. 6 is a side elevation of the die assembly in the FIG. 2 position.
Figure 7:
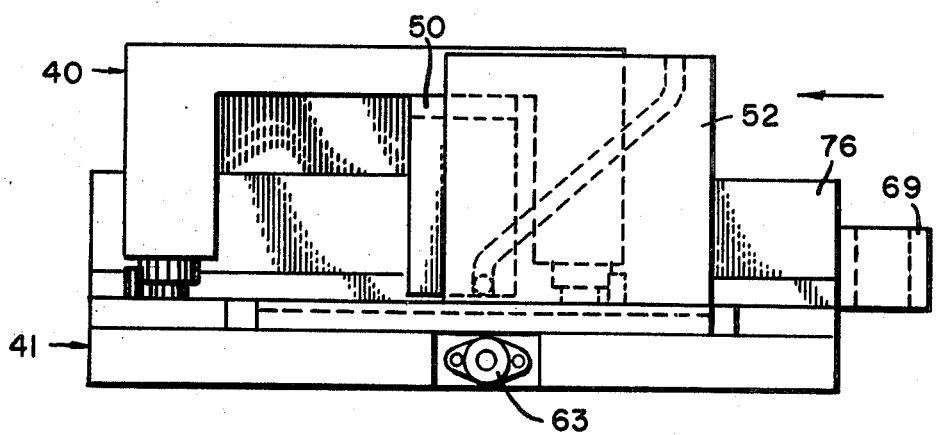
FIG. 7 is a view similar to FIG. 6, but with the die assembly in the FIG. 3 position.
Figure 8:
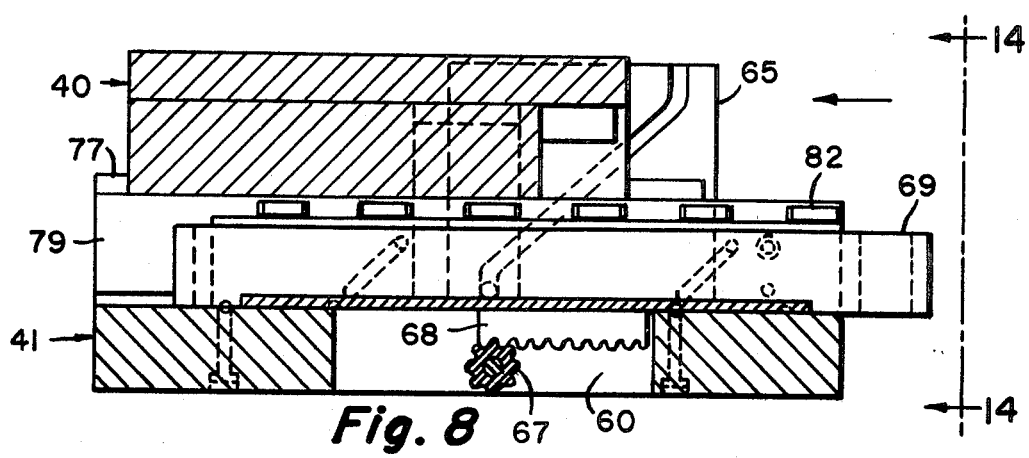
FIG. 8 is a sectional view on the plane 8—8 of FIG. 5.
Figure 9:
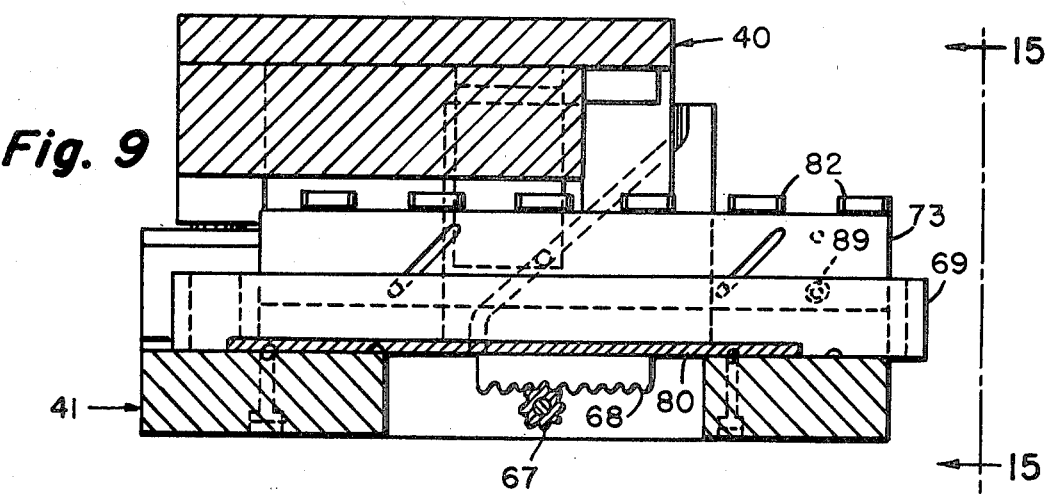
FIG. 9 is a sectional view similar to FIG. 8, with the assembly approximately one-third of the way open.
Figure 10:
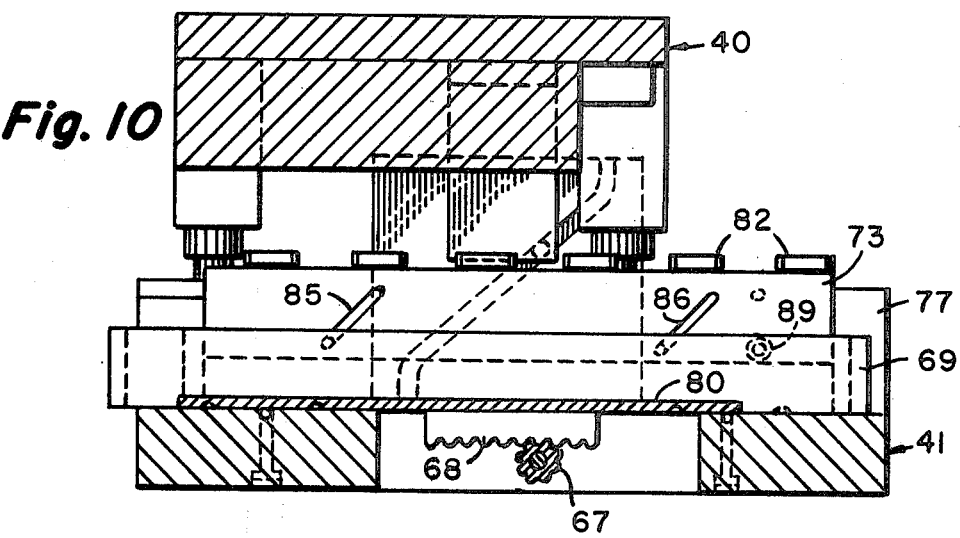
FIG. 10 is a sectional view similar to FIG. 9, with the upper and lower die sections approximately two-thirds of the way toward the fully separated position.
Figure 11:
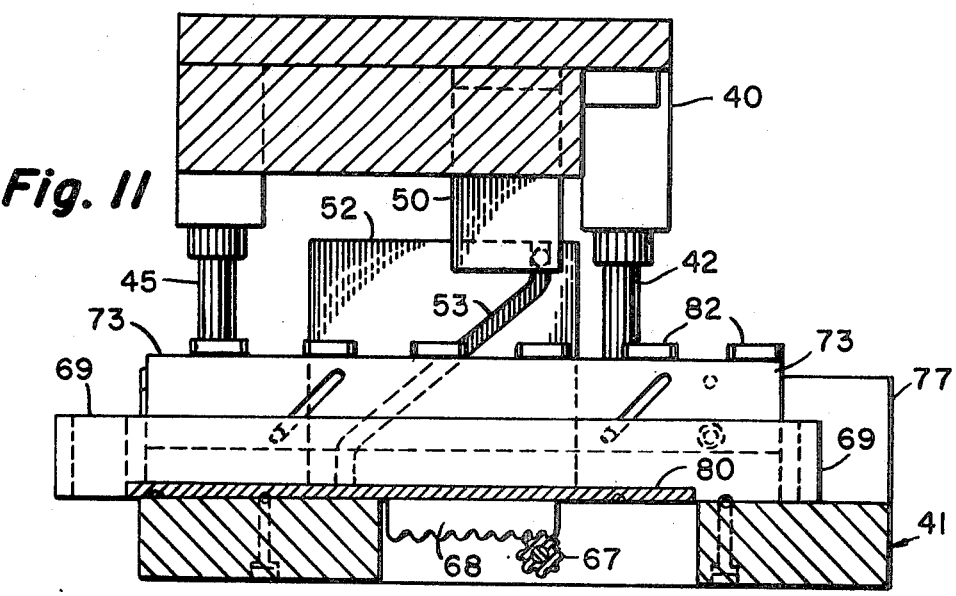
FIG. 11 is a sectional view of the die assembly approximately one-third of the way toward the fully closed position, taken on the plane 11—11 of FIG. 4.
Figure 12:
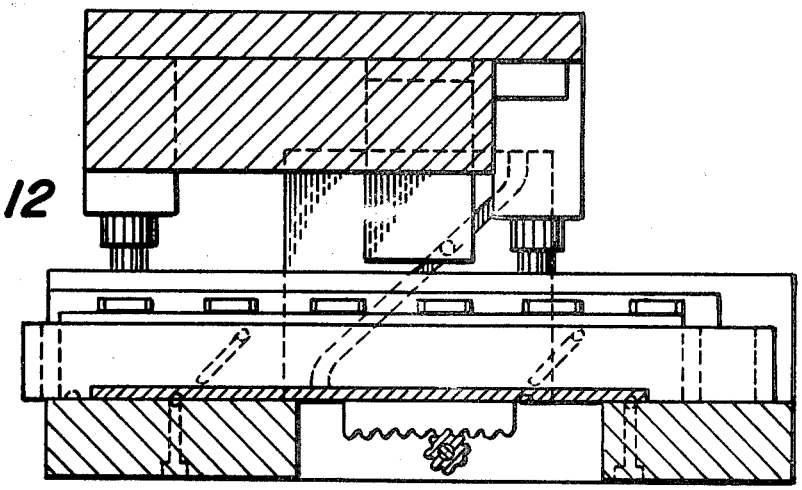
FIG. 12 is a sectional view on a plane similar to that of FIG. 11, showing the die sections approximately one-third of the way toward the fully closed position.

The sequence of the various phases of the transfer movement is evident from a comparison of FIGS. 6 through 12. FIG. 6 corresponds to FIG. 11, and illustrates the condition of the mechanism as the press begins its downward stroke. The entrance of the driving followers into the inclined portion of the cam slot 53 in the plate 52 begins the cycle of operation by first inducing a movement from left to right of the actuator bar 69. It must be kept in mind that the movement of stock and work pieces through the die proceeds from right to left in all of the views in the drawings. This initial movement of the actuator bar 69 to the right carries the followers 83 and 84, and takes place while the carrier bar 73 and the guide bar 72 are held in place by the detent assemblies. The movement of the followers 83 and 84 within the cam slots 85 and 86 on the carrier bar therefore lowers the carrier bar to deposit the parts at the proper stations in the die to be acted upon by the die components carried in the upper die section. After the retracting stroke has been completed, continued rotation of the shaft 62 moves the actuator bar, the guide bar, and the carrier bar to the position shown in FIG. 8. On the upward movement of the press, a shift within the freedom of the lost motion takes place as is evident by comparing FIGS. 8 and 9. This shift has resulted in the movement of the followers 83 and 84 within the cam slots 85 and 86 to induce lifting of the carrier bar 73, so as to raise the parts with the pads 82 preparatory to shifting them down to the next die station. FIG. 10 shows an intermediate position in this transferring movement. FIG. 11 represents the terminal position of the transfer movement, at which the work pieces would still be supported by the carrier pads 82.

Figure 13:
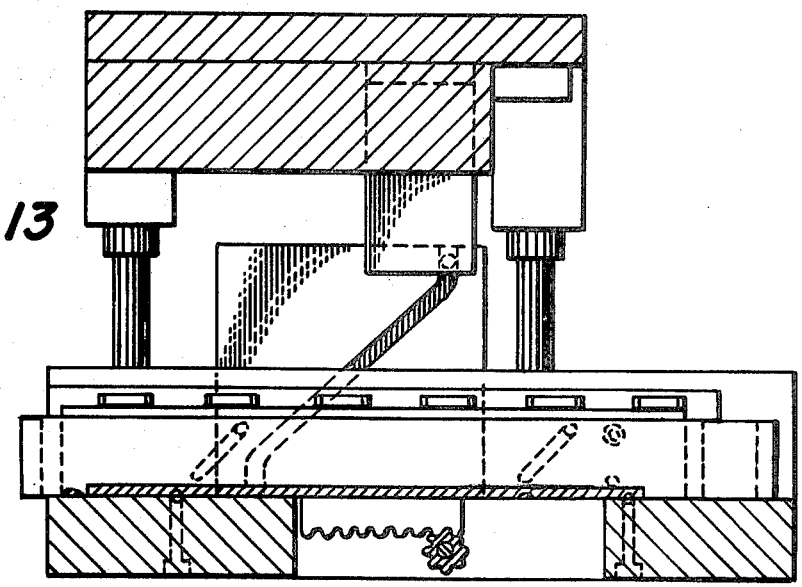
FIG. 13 is a sectional view on a plane similar to that of FIG. 12, showing the die sections in the fully open position. In this Figure, the transfer mechanism is shown retracted from the normal position associated with the elevation of the upper die section.

FIG. 13 illustrates an interesting feature of this mechanism, which results from the releasable characteristics of the detents 87 and 88, and also is associated with the brake mechanisms shown in FIGS. 19 and 20. FIG. 13 shows the die fully open, which would normally place the carrying bar 73 at an elevated position, as shown in FIG. 11. If some sort of accidental malfunction should take place, and which might threaten to close the upper die section on the elevated transfer mechanism, forces applied to the carrying pads 82 will quickly shift the carrying bar 73 downward along the slopes of the cam slots 85 and 86, accompanied by pulling the guide bar 72 free of its restraint by the detents 89, or against the restraint of the brake mechanism shown in FIGS. 19 and 20.

Figure 22:
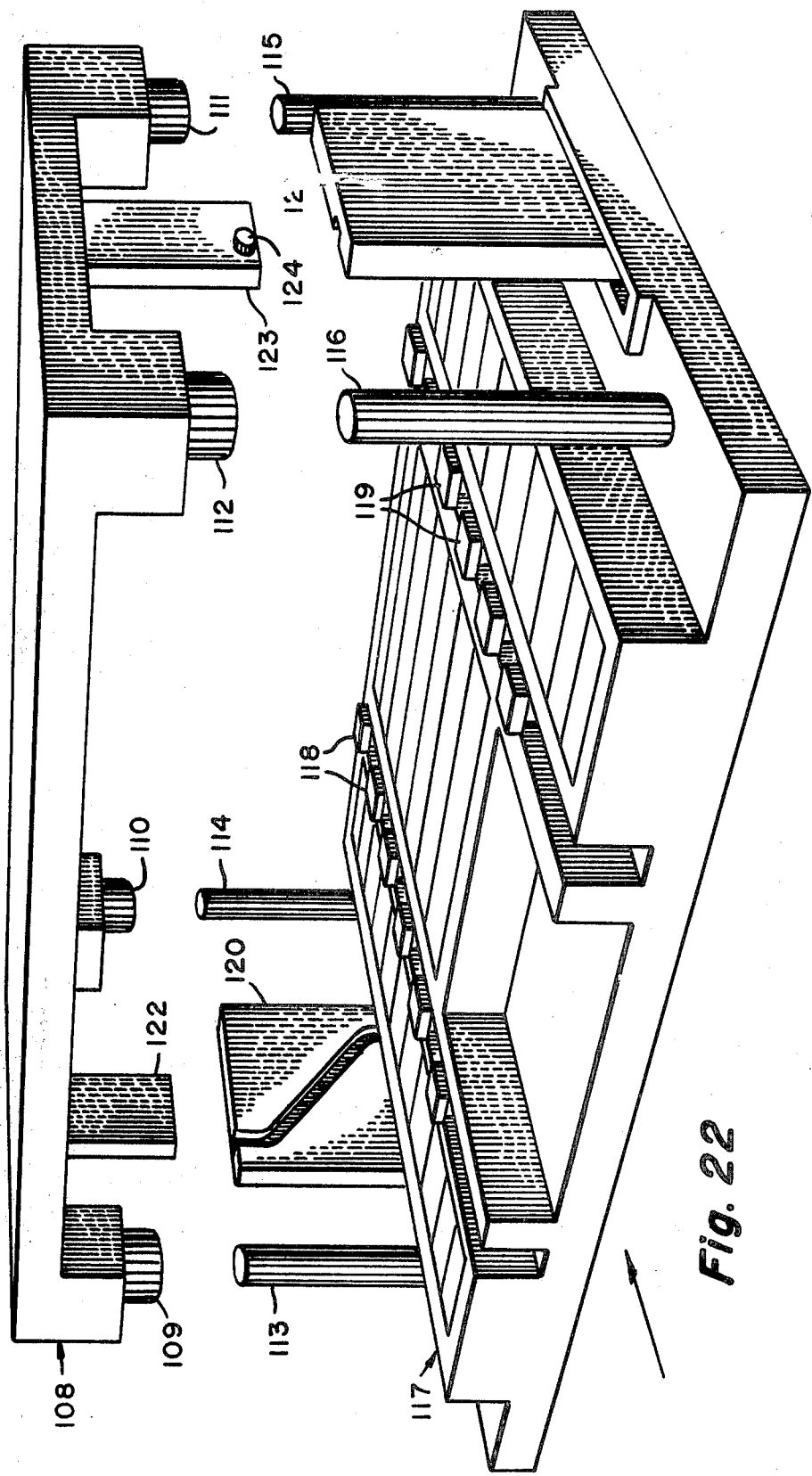
FIG. 22 is a perspective view of a further modification of the invention of a type frequently desirable for incorporation in large die structures, and using two sets of transfer systems operating along parallel paths.
Figure 23:
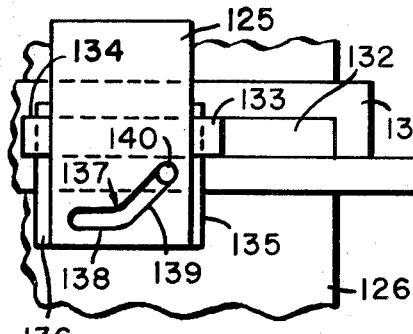
FIG. 23 shows a further modification of the invention, and illustrates a mechanism capable of moving in three dimensions successively.

FIG. 22 shows an arrangement for large die assemblies, in which relatively long and narrow parts move through the die in a direction perpendicular to their length. The upper die section 108 has the bearings 109–112 for receiving the locating posts 113–116 of the lower die section 117. A pair of transfer assemblies arranged in parallel are mounted on the lower die section, and these transfer assemblies include carrying bars provided with the series of pads indicated, respectively, at 118 and 119. The pair of transfer assemblies associated with these components are driven by a common shaft through appropriately located spur gears, the opposite ends of the shaft being driven by the cam plates 120 and 121 in conjunction with cam followers mounted on the brackets 122 and 123, as indicated at 124. The transfer mechanisms associated with the series of pads 118 and 119 are identical to those previously described. These two transfer mechanisms are capable of picking up the elongated work pieces at two points and transferring them through the successive die stations.

Figure 28:
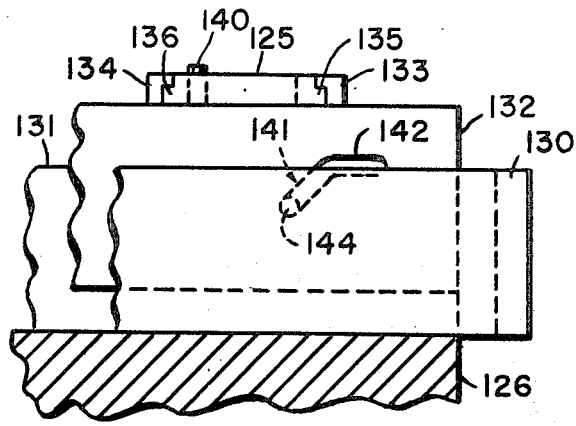
FIG. 28 is a fragmentary elevation corresponding to FIG. 27.
Figure 29:
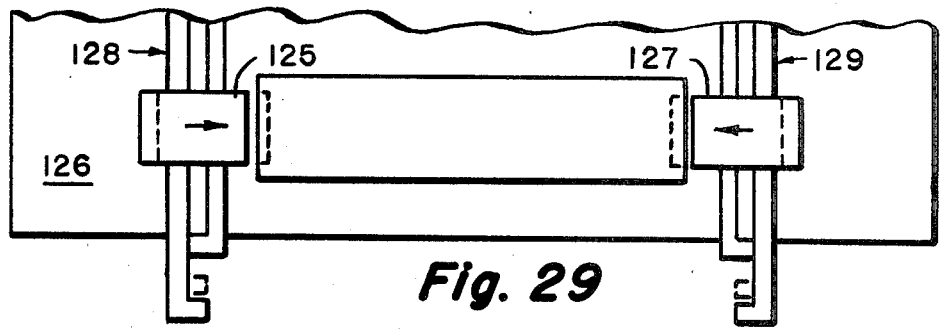
FIG. 29 is a fragmentary schematic view showing a typical type of interengagement of the lifting-transferring system with a work piece.

FIGS. 23 through 29 illustrate a modified form of the invention providing transfer movement in three dimensions. The horizontal arm 125 is given a three-phase movement permitting it to reach inward from the side area of the lower die section 126, and then lift and transport a work piece from station to station. A device of this type may be used either where the work pieces are best engageable at their opposite ends, as shown in FIG. 29, or where it becomes impractical to interrupt the central area of the die structure to provide for the transfer mechanism. In FIG. 29, the arms 125 and 127 associated respectively with the transfer mechanisms 128 and 129 are the same, except for "hand." The actuator bars 130 are driven by spur gears as previously described, and the guide bars 131 correspond to the guide bars 72 of FIG. 21. The lifting bars 132 have the same movement relationship with the guide bars 131 and the actuator bars 130 as described in conjunction with the carrying bar 73 of FIG. 21. The bar 132, however, is provided with the opposite guideway blocks 133 and 134 establishing a path of sliding movement horizontally transverse to the path of movement of the actuator bar 130. The arms 125 have the opposite side flanges 135 and 136 interengaged with the guideway blocks 133 and 134 to retain the arm 125 in assembled relationship. Where the stability of the arm 125 about a vertical axis is critical, a longer bearing engagement between the blocks 133 and 134 and the flanges 135 and 136 is easily provided.

Figure 24:
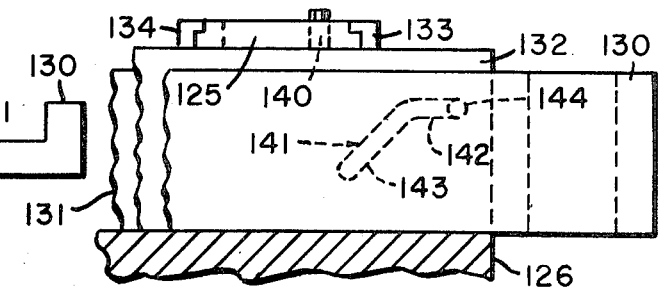
FIG. 24 is a fragmentary elevation of the same mechanism as shown in FIG. 23.
Figure 25:
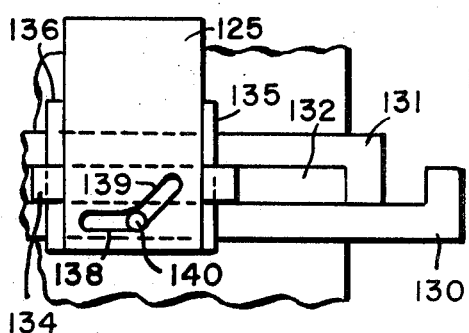
FIG. 25 is similar to FIG. 23, but shows an intermediate position of the mechanism.
Figure 26:
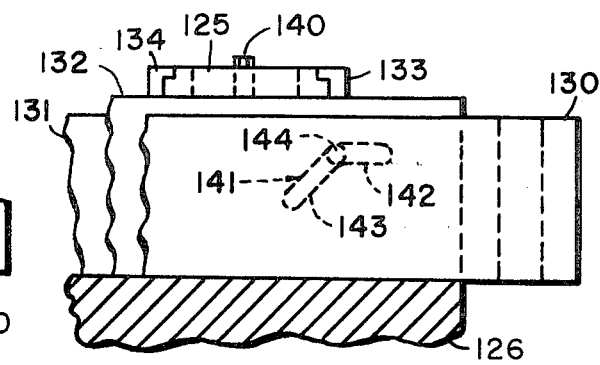
FIG. 26 is a fragmentary elevation corresponding to FIG. 25.
Figure 27:
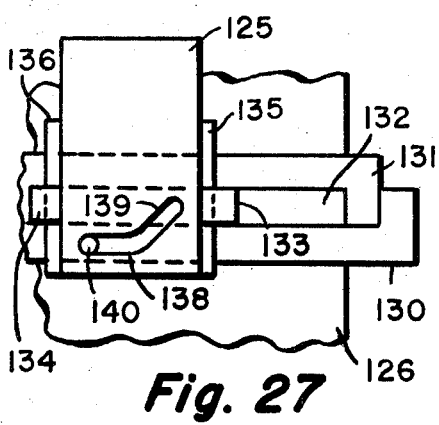
FIG. 27 is similar to FIGS. 23 and 25, and shown a subsequent position to that illustrated in FIG. 25.

The arm 125 has the cam slot 137 containing the dwell portion 138 (parallel to the path of movement of the actuator bar 130), and the inclined portion 139. The follower 140 is mounted in the top of the actuator bar 130, which also has followers interengaged with cam slots as shown in FIGS. 24, 26, and 28 at 141. These slots are also provided with the horizontal dwell portions 142 and the inclined portions 143. The followers 144 engage these slots. The placement of the dwell and inclined portions of the slots 137 and 141 are such that the continuous linear movement of the actuator bars 130 will induce a sequence in the movement of the arm 125, as a result of the fact that the inward movement controlled by the cam slot 137 can take place either before or after the lifting movement induced by the cam slots 141. It is preferable that the followers 140 be vertically long enough to accommodate the lifting movement of the arm 125 without disengaging from the slots 137.

Figure 30:
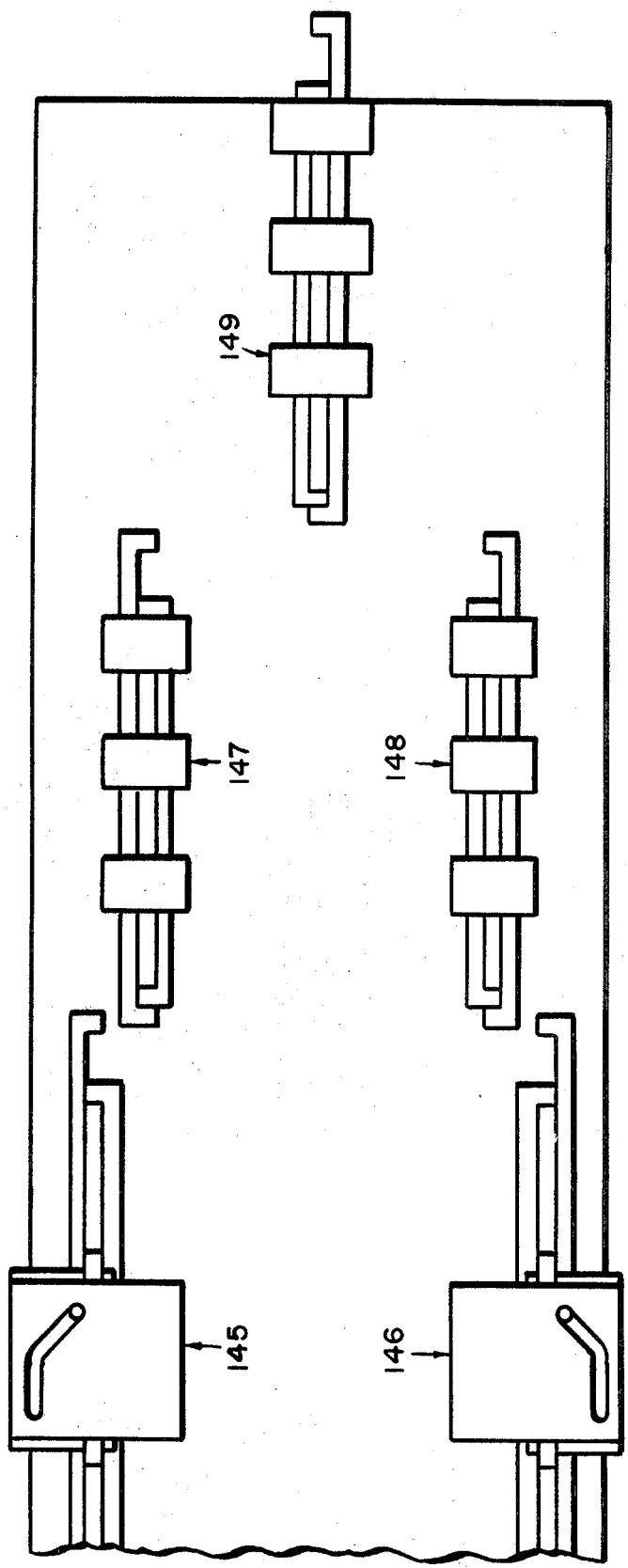
FIG. 30 is a schematic top view of a lower die section making use of a variety of forms of the transfer mechanism where the nature of the die function is such as to require different transfer movements at the successive stages of the die operation.
Figure 31:
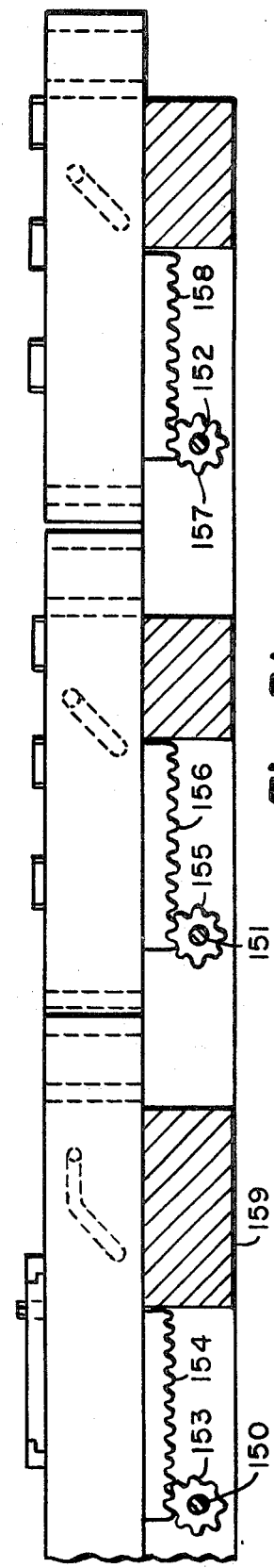
FIG. 31 is a sectional elevation of the mechanism illustrated in FIG. 30.

FIGS. 30 and 31 illustrate a complex layout showing several different types of transfer mechanism associated with a single die assembly, with the die components omitted for clarity. Situations frequency arise in which the transfer pattern must change during the course of movement of the work pieces through the die, as the blanking and forming operations alter the dimensions of these parts. The necessary spacing of the die stations will also be a consideration. The transfer mechanisms generally indicated at 145 and 146 are similar to those discussed in connection with FIGS. 23 through 29. These permit the work pieces to be engaged at their opposite ends. The transfer assemblies indicated at 147 and 148 are the simple two-dimensional form discussed in connection with FIG. 21. These two mechanisms provide support for the work pieces at spaced points, and the centrally located transfer mechanism 149 is positioned to operate on the central area of the work pieces, where this appears to be necessary. The pairs of transfer mechanisms 145-146 and 147-148 are each driven by the shafts 150 and 151, and the shaft 152 is responsible for driving the central transfer mechanism 149. The associated spur gears and racks 153-154, 155-156, 157-158 are as previously described. These are all mounted on the base 159 of the lower die section. The gear ratio between the spur gears and the racks may be altered to change the degree of advance of the various transfer mechanisms involved, or the length and inclination of the driving cam slots can be varied to suit the particular requirements.

The various forms of mechanism described here have a tremendous advantage in mechanical simplicity, as compared with the remote-control type of device, and even compared with the previous forms of lost-motion structures. The stability and plain configuration of the components leads itself to economical manufacture, and also the presentation of large, flat, and consequently wear-resistant surfaces of interengagement. Under normal circumstances, a transfer mechanism will be so "tailored" to the needs of a particular die assembly that it is preferably discarded after the die assembly has worn out. Many of these are designed to produce many hundreds of thousands of pieces, and the simplicity of the transfer mechanism components makes it unnecessary to salvage the transfer components. The wear characteristics of known forms of transfer mechanism are such that they are usually completely unreliable by the time the principal die components have worn out, so the concept of the salvage of transfer components is largely meaningless. Attention is also directed to the general linear characteristic of the assembly constituting each transfer mechanism, which lends itself best to incorporation in existing die structure without undue interruption of the acting die components. The elements of the transfer mechanism are also obviously either of a configuration to require a minimum of machining operations, or are stock items that may be purchased "off the shelf" as standard equipment.

I claim:

1. In combination with a die assembly having upper and lower sections adapted for relative reciprocation, a transfer mechanism including means forming a first guideway on one of said die sections, a carrier bar movably mounted on said one section, an actuator bar movably mounted in said first guideway, said carrier and actuator bar having interengaged cam and follower means providing for transverse movement of said carrier with respect to said actuator bar, a guide bar movably mounted in said first guideway, said guide and carrier bar having second guide means establishing a direction of relative movement of said carrier transverse to said guideway, holding means releasably securing said guide bar at spaced positions along said first guideway, and drive means operative to reciprocate said actuator bar along said first guideway, wherein the improvement comprises:

an assembled relationship wherein said carrier bar is interposed between said actuator bar and said guide bar; and said holding means releases on application of predetermined force to said guide bar independently of the position thereof.

2. A combination as defined in claim 1, additionally including stop means limiting the relative freedom of movement of said actuator bar and guide bar in the direction of said first guideway, said stop means being independent of said cam and follower means.

3. A combination as defined in claim 2, wherein said stop means is a spaced pair of abutments on said actuator bar, said abutments being engageable with the opposite ends, respectively, of said guide bar.

4. A combination as defined in claim 1, wherein said holding means is a spring-loaded detent engageable with a recess.

5. A combination as defined in claim 1, wherein said holding means is a friction brake.

6. A combination as defined in claim 5, wherein said brake includes a third guideway transverse to said first guideway and normally fixed with respect to said one die section, and includes a pair of shoe members slidably mounted in said third guideway and engageable with opposite surfaces, respectively, on said guide bar, and also includes biasing means urging said shoe members into bearing engagement with said guide bar.

7. A combination as defined in claim 1, additionally including a second carrier bar and guideway means interengaging said carrier bars for relative transverse movement, and also including second cam and follower means interengaging said actuator bar and second carrier bar, said first and second cam and follower means each having a dwell portion providing a sequence of directions of motion to said second carrier bar.

* * * * *